(12) United States Patent
Krause

(10) Patent No.: US 9,483,020 B2
(45) Date of Patent: Nov. 1, 2016

(54) METHODOLOGY FOR A PRACTICAL FLAT PANEL FORMAT HOLOGRAPHIC DISPLAY UTILIZING THE NARROW HOLOGRAM AND HOLODOT CONCEPTS

(71) Applicant: Robert Krause, Bonsall, CA (US)

(72) Inventor: Robert Krause, Bonsall, CA (US)

( * ) Notice: Subject to any disclaimer, the term of this patent is extended or adjusted under 35 U.S.C. 154(b) by 84 days.

(21) Appl. No.: 14/608,831

(22) Filed: Jan. 29, 2015

(65) Prior Publication Data

US 2015/0261185 A1    Sep. 17, 2015

Related U.S. Application Data

(60) Provisional application No. 61/952,563, filed on Mar. 13, 2014.

(51) Int. Cl.
*G03H 1/08*    (2006.01)
*G03H 1/22*    (2006.01)

(52) U.S. Cl.
CPC .......... *G03H 1/2294* (2013.01); *G03H 1/2205* (2013.01); *G03H 2001/221* (2013.01); *G03H 2001/2271* (2013.01); *G03H 2225/33* (2013.01); *G03H 2225/60* (2013.01)

(58) Field of Classification Search
CPC ...... G02B 5/045; G02B 5/06; G02B 26/005; G03H 1/2294; G03H 1/08; G03H 1/22; G03H 1/2205; G03H 1/02
USPC ........................................................ 359/9, 32
See application file for complete search history.

(56) References Cited

U.S. PATENT DOCUMENTS

2010/0214634 A1*    8/2010    Kroll ..................... G02B 5/045
359/9

* cited by examiner

*Primary Examiner* — Euncha Cherry

(57) ABSTRACT

An apparatus for creating a holodot comprising of a low resolution 2 dimensional spatial light modulator (SLM) and two crossed striped high resolution spatial light modulators. The first SLM creates a 2D image and the second two focus the light into an observer's pupil.

6 Claims, 5 Drawing Sheets

METHODOLOGY FOR A PRACTICAL FLAT PANEL FORMAT HOLOGRAPHIC DISPLAY UTILIZING THE NARROW HOLOGRAM AND HOLODOT CONCEPTS

CROSS REFERENCE TO RELATED APPLICATIONS

The present patent application is a formalization of a previously filed provisional patent application entitled "A Methodology For a Practical Flat Panel Format Holographic Display Utilizing The Narrow Hologram And Holodot Concepts," filed Mar. 13, 2014, as U.S. patent application Ser. No. 61/952,563 by the inventor(s) named in this application. This patent application claims the benefit of the filing date of the cited provisional patent application according to the statutes and rules governing provisional patent applications, particularly 35 USC §119 and 37 CFR §1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to synthesizing of a holodot from coherent laser light. An apparatus comprising of a low resolution 2 dimensional spatial light modulator (SLM) and two crossed striped high resolution spatial light modulators. The first SLM creates a 2D image and the second two focus the light into an observer's pupil.

BACKGROUND

The problem with existing stereo 3D is eye strain caused by skew and eye tracking focus disconnect. Any body who has tried to market 3D over the past 130+years has become painfully aware that one can not market away Eye strain.

The logical solution would be to just create a Holographic display. Conventional wisdom would dictate this would require a panel with wave length pixel spacing. Each with the ability to control both the phase and amplitude of its sourced light. This would require hundreds of billions of pixels. A very impractically to do large number. The mistake that convictional wisdom makes is that it neglects to realize that one only has to worry about the light field at the viewer's eyes pupils. This means two things. First, one only has to create a hologram at the eyes pupils. And second, one can ignore any light that falls out side these pupils.

The invention given here utilizes these two concept to create a holographic display that only requires a panel with standard pixel density. That is 1900×1080 for high definition.

SUMMARY

Referring to FIG. 1, items 101,102, and 103 comprise the main basic components of this flat panel holographic display concept. The purpose of item 101 is to provide parallel Laser light for item 102. It provides the same function as a laser/ telescope beam expander combination except in a flat package for flat panel compatibility. Item 102 is known as spacial light modulator. It consists of a standard density pixel array were each pixel can modulate the light from 101 in both phase and amplitude. It creates a narrow angle hologram for Items 103. The two items comprising 103 create a lens variable in both focal length and position. It focuses the light of the narrow angle hologram from 102 down to a holodot 104 at the pupil of eye 105.

The display system multiplexes between the three main colors and both pupils of the viewer to create the full illusion. If there are multiple viewers then the display would also have to multiplex between the viewers.

The display has two cameras looking at the viewer. Through the use of image processing software, the system will track the three dimensional position of each pupil. This information will be used to control the variable lens 103 so that the holodot 104 will always be at the pupil of eye 105 regardless of the viewers head position.

The pupil position will also be used to control the content of the spacial light modulator 102 so that the holodot 104 is the correct portion of a nonexistent full hologram plane located at a position where it coincides with the pupil of eye 105. To the viewer, it will look like a full hologram.

For a computer generated object, the computer would have to constantly holographically re-render the object to keep up with eye 105's position. This is doable and probably the preferred approach for a scene consisting of a finite number of generated objects.

For capturing a real scene, many two dimensional pictures at different angles would have to be taken and stored. The display system would have to analyze these pictures along with eye 105's position to create the holodot 104. Some day this might actually be done. But, for now it is a vast over kill. In stead we could take advantage of existing stereo 3D technology. This is important because the expertise and hardware all ready exists for the production and distribution of stereo 3D content along with a library of actual content.

For a standard 3D display, the focused image plain (FIP) always coincides with the screen of the display. If the viewers eyes are tracking an imaged object which is not at the screen then the eyes which naturally want to be focusing at the imaged object's distance, are unnaturally being forced to focus at the screen's distance. This causes eye strain. The holographic display in FIG. 1 can place the FIP at any distance behind, at, or in front of the display. So, it can and will place the FIP at the imaged object's distance thus, eliminating this source of eye strain for good.

The display system will determine where to place the FIP using the measured distance between the viewers pupils and or basic camera information stored with each frame.

For a standard 3D display, the separation between the left and right eye views are always perfectly horizontal relative to the display. This is fine as long as the viewer keeps his eyes perfectly horizontal at all times. If the viewer tilts his head then one eye will be force to look up while the other one will be force to look down. This is unnatural and will also cause eye strain. Because the display system knows the distance of the imaged object which the viewer is looking at, it can slide the left and right images around so that the separation tilt angle matches that of the viewers head. Thus eliminating another source of eye strain.

The left and right images can also be slid around enlarged or contracted to make the imaged object which the viewer is looking at appear to stay fixed in space regardless of the viewers head movement. This will support the illusion of a hologram from a set of stereo images.

With these and possibly other holographic enhancements of standard stereo 3D content, the question is, what is the difference between enhanced stereo 3D and a full hologram. Well, if one is viewing an enhanced 3D object and decides to move his head to get a better look at the side of the object, the object will stay where it is in space, but, it will conveniently rotate to keep showing the viewer the same face. Just like, the moon always points the same face towards the earth. This is because this is the only view it has. Besides being a cute nuisance, nobody is going to get eye strain from this. In fact for moving content it would be almost impossible to determine if that rotation was from the viewers head movement or camera content object movement.

DETAILED DESCRIPTION OF THE PRESENTLY PREFERRED EMBODIMENTS

Multiple Images

Figure 2:
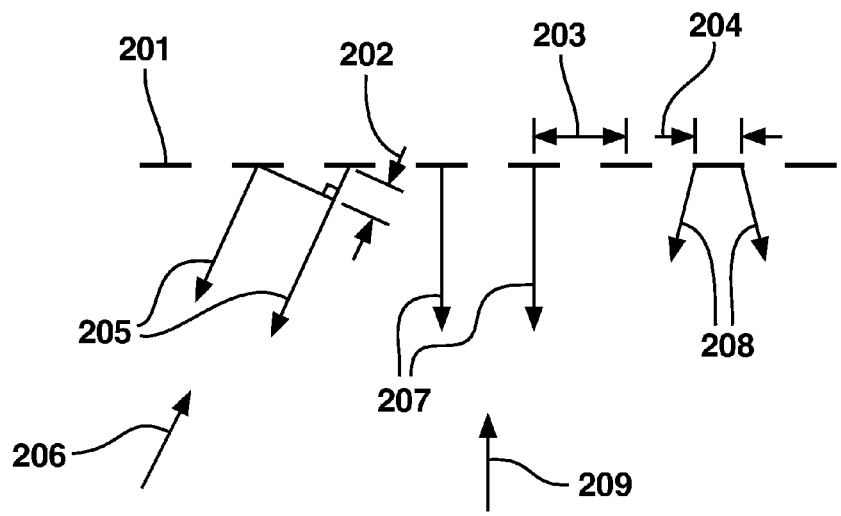
FIG. 2 is a top view of evenly spaced phase coherent light sources.

Before one can began any kind of detailed description, one must first under stand the concept of an image. Referring to FIG. 2, each of the dashes of item 201 is a uniformly illuminated correlated parallel monochromatic light source. Each point along a dash is a point source of light. Each having the same wave length, phase and intensity. Each of the dashes is identical. This is identical to a beam expanded laser light source with a grading. Where each dash of 201 is an opening in that grading.

The spread 208 of the light from each of these dash light source is related to width 204 of the source. The smaller the width 204 the greater the spread 208. The arrows 207 show the primary direction of light coming from the sources 201. It is perpendicular to sources 201 because that is the angle at which the phases of the light from each of 201's sources is the same. A viewer looking in the direction of arrow 209 would see a single point source at infinity.

Arrows 205 show another direction of light coming from the sources 201 where the phases of the light from each of 201's sources is the same. This is because, at this angle, the difference in path length between adjacent sources 202 is exactly one wave length. A viewer looking in the direction of arrow 206 would also see a single point source at infinity.

If a viewers angular field of view is large enough, he will see the point source at infinity in the direction of 209 and an image point source at infinity in the direction of 206. In fact, he would see an image at every angle where the delta 202 is an integral multiple of the wave length.

The number of images one can see depends of the light spread 208. The wider the width 204 of the source the narrower the spread 208 and the fewer images a viewer sees. Ultimately when the width 204 equals distance 203 between the sources, the viewer will only see the single primary point source at infinity and no images.

The Narrow Angle Hologram

Figure 3:
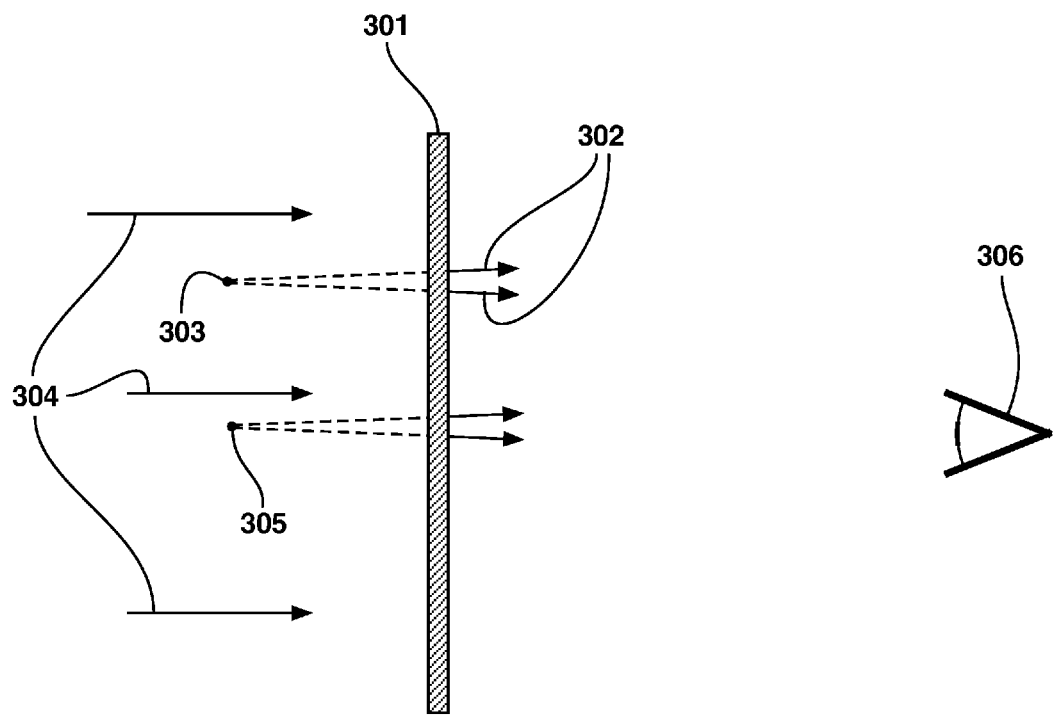
FIG. 3 is a side view of the 2 dimensional spatial light modulator generating 2 image points. It also includes an observer's eye.

Referring to FIG. 3, item 301 is a spacial light modulator with a standard pixel resolution. Each pixel can modulate the coherent laser light 304 in both amplitude and phase. This can be done using liquid crystal technology.

By modulating the light 304, the panel 301 can create the same light pattern at the plane of 301 that a pixel point source 303 located in 3D space would create if it were real.

Since any scene can be represented by finite number of pixel point sourced (303 typical), One can program the panel 301 with a linear combination of each pixel's light pattern to create the light pattern for the entire scene.

The angular spread 302 of the light coming from the panel 301 will be limited to very small angles because of the low pixel resolution relative to the size of a wave length of light. Hence the name "narrow angle hologram".

For holographically enhanced 3D, at any one time, all the pixels are in the same plane. For this case, calculating the light pattern to be loaded into the panel 301 could be done using an easer math operation called a convolution as apposed to calculating and adding in the light pattern for each and every 3D space pixel separately. The math involved in creating the full light pattern loaded into the panel 301 utilizes complex numbers and is straight forward for anyone with the proper math back ground. For this reason the math is not patentable and, there for, will not be discussed here.

Figure 4:
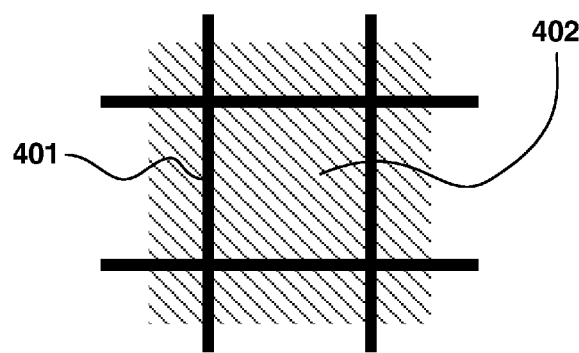
FIG. 4 is a front view of a single modulating cell of the 2 dimensional spatial light modulator.

FIG. 4 shows the front view of a typical pixel of the spacial light modulating panel 301. We have learned form our previous discussion on multiple images that it is best to maximize the active illuminated pixel region 402 and minimize the dark dead regions 401 between the pixels in order to minimize multiple images. Beam expander techniques can be used to help minimize these 401 dark zones.

We have also learned from the multiples images discussion that maximizing region 402 will minimize the angular light spread 302 of FIG. 3. This means that, as an example, all though eye 306 can see pixel image 305 it would not be able to see pixel image 303. The eye would have very narrow tunnel vision and could only see a very small portion of the scene created by the panel 301.

The Holodot

Figure 5:
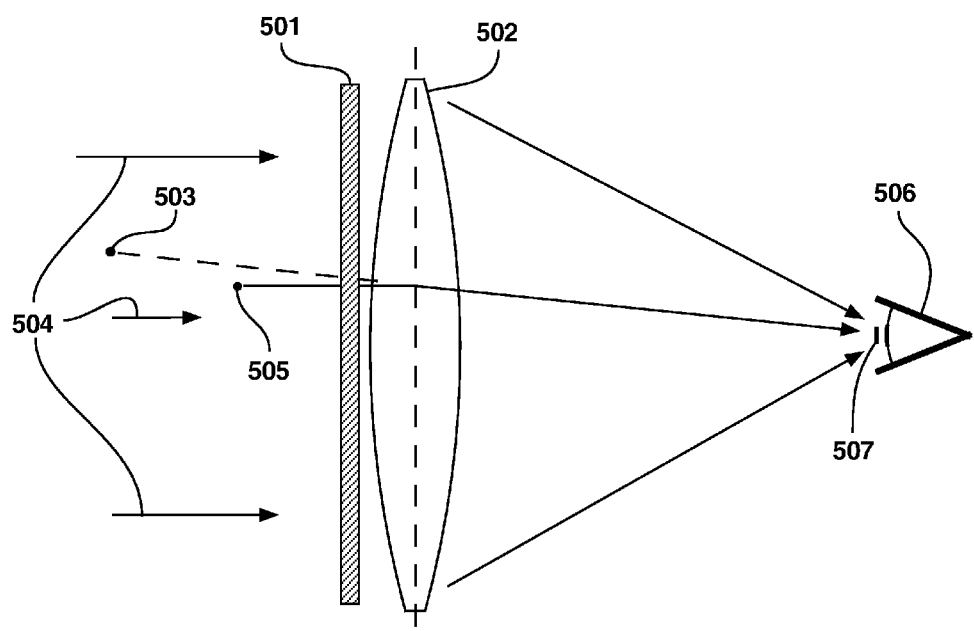
FIG. 5 is a side view of the 2 dimensional spatial light modulator, with a spherical lens, generating 2 image points. It also includes the holodot and an observer's eye.

Referring to FIG. 5, to solve this tunnel vision problem, lens 502 is places in front of the modulating panel 501 to converge the light towards eye 506 creating the holodot 507 at the focal point of lens 502. If the pupil of eye 506 is at this holodot, Then the eye will be able to see all of the images created by the panel 501 form the laser light source 504. Thus, solving the tunnel vision problem.

There are two draw backs to this lens. First, the lens 502 will distort the scene created by the panel 501. The lens would re image a typical 3D spatially located pixel 505 to the location of 503. This distortion issue is easily solved by mathematically pre inverse distorting the scene before it is loaded into panel 501. When the eye views this inverse distorted scene through the distorting lens 502, it will see the original undistorted scene.

The Variable Lens

The second draw back is that for fixed lens, the position of the holodot 507 is fixed. This means that the eye would have to stay at this one holodot position at all times. Besides the unacceptable requirement of having the viewer keep his head at one position at all times, this would make multiplexing between the eyes impossible.

Figure 6:
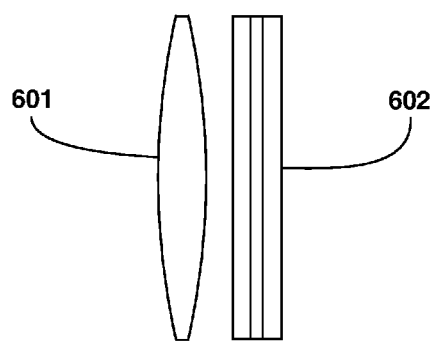
FIG. 6 is a side/edge view of two cylindrical lens one vertically oriented and the other horizontally oriented.

The obvious solution is to make lens 502 variable in both focal length and, up down left right, position. The first step in this solution, is to realize that lens 502 can be replaced by two cylindrical lenses 601 and 602 as seen in FIG. 6. Lens 601 is curved along the vertical axis and lens 601 along the horizontal axis.

Figure 7:
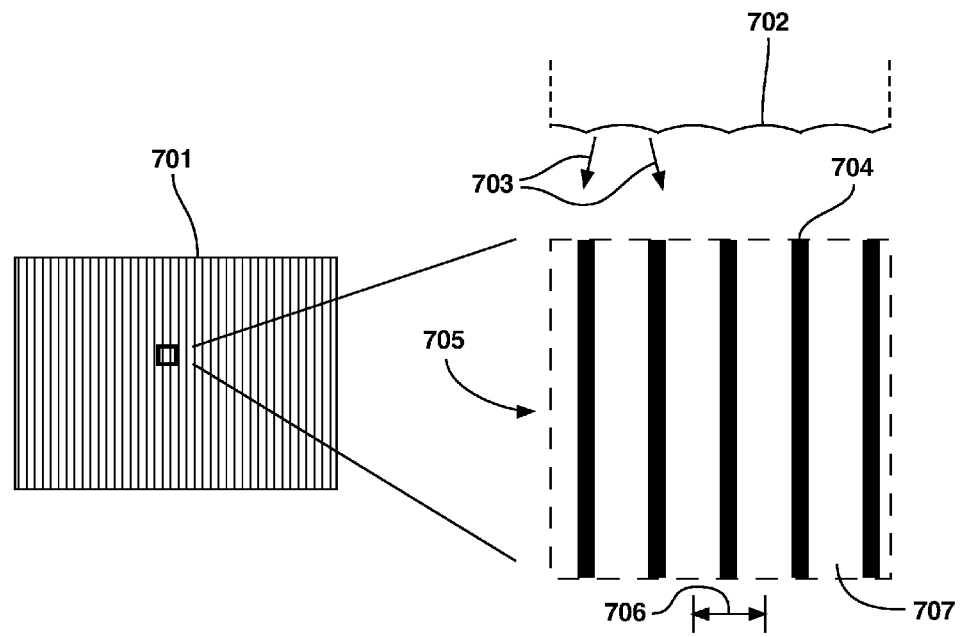
FIG. 7 is a front view of a vertically striped liquid crystal phase modulating panel. The figure also includes a front and top view of an enlarged section of this panel.

The second step is to realize that a cylindrical lens can be made with a striped liquid crystal panel 701 of FIG. 7. Each typical liquid crystal cell stripe 707 as seen in enlarged section 705 can be programmed to shift the phase, of light passing through it, an arbitrary amount. By programming the cells with the correct combination of phase shifts one can create a cylindrical lens with an arbitrary position and focal length.

Figure 8:
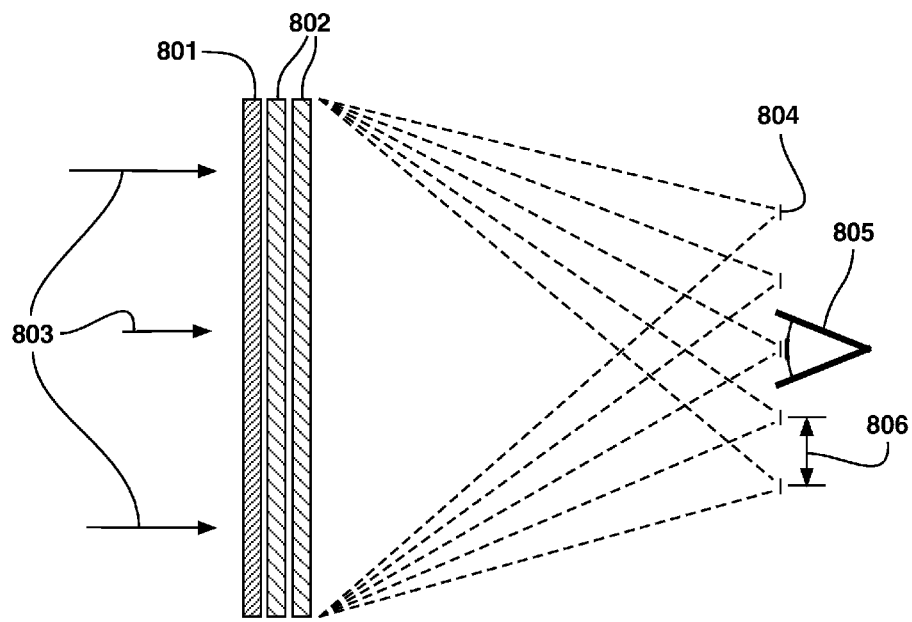
FIG. 8 is a side view of the three spatial light modulators generating a multitude of holodots. It also contains an observer's eye.

FIG. 8 shows the results in one of the dimensions of replacing lens 502 of FIG. 5 with the two striped liquid crystal panels 802. One would have vertical strips and the other horizontal.

As we have learned form our earlier discussion of multiple images, this set up would produce multiple holodots 804 typical . The spacing 806 between the holodots would depend on the spacing 706 between the liquid crystal stripes (LCS). The smaller the 706 spacing the larger the 806 spacing.

For the minimal holodot spacing 806 and greater, where only one holodot lands on the pupil, the viewers eye 805 would only see the primary scene image and no other multiples. The pupil is a spacial filter removing multiples images. This minimal spacing 806 requires about 10 thousand liquid crystal stripes in the panels 802.

For the multiplexing process between eyes to work, while one eye 805 typical is seeing a holodot, the other eye must either be shuttered or, its pupil must be in a dead zone between holodots. For shuttering, the same standard 3D shuttering glasses already developed and in production could be used.

In a three dimensional version of FIG. 8, the holodots 804 form a two dimensional grid pattern in a plane at the pupil. This grid has two horizontal holodot free dead zones, one above and one below the pupil. So, if one tilts the grid by tilting the display, at the right angle, one can place a dead zone at one pupil while keeping the other pupil on the holodot.

This could be done by mounting the display on a gimbal which would rotate it to maintain the proper angle difference between the holodot grid and the pupil axis regardless of head movement. At the same time the display content would be counter rotated so that the viewer would see the same unchanged scene regardless of display angle or rotation.

The display would not change in rotation for multiplexing between the pupils of a single viewer.

The display would not be able to rotate fast enough to multiplex between viewers. So, this method would only work for a single viewer.

Both of these shutter or rotation methods would only be a possible compromise for early generation displays.

If you increase the number of stripes to about one hundred thousand, The spacing distance 706 of the stripes would decrease enough to cause the separation distance 806 of the holodots 804 to be great enough so that, while the main holodot is on one pupil, the first holodot image would fall on the out side the viewer's other pupil. Although this means that a single viewer would not have to ware any 3D type shutter glasses, multiple viewers would, because the holodot spacing 806 is not enough for the first holodot image to fall on the out side of a group of viewers.

If instead of making the spacing 706 of the stripes the same, one varies them in a pseudo random manner, then, although the primary holodot would be unchanged, all the other holodot images will be blurred into one big constant illumination.

To explain this lets refer back to FIG. 2. A secondary image is formed because the angle of arrows 205 is the same for each pare of light sources 201. The angle is the same because both the separation distance 203 and wave length distance 202 are the same. Now is one if keeps 202 the same while varying 203 then the angles will vary resulting in a blurred non primary image.

Most of this blurred image light either lands on the viewers face or misses the viewer all together and is thus unnoticed by the viewer. It is only the small portion of light that hits the viewer pupil which is added as a constant illumination to the scene.

The attenuation of this constant illumination relative to the average illumination of the scene is equal to the square of the quotient of the pupil diameter divided by the non blurred distance 806 between the holodots (FIG. 8). For 100 k striped 802 panels, this constant unwanted illumination works out to be approximately only a very tolerable 1% of the average illumination.

The effects of this unwanted constant illumination could be minimized by numerically subtraction the calculated average illumination of the scene from the scene before processing and loading it into panel 801.

When the spacing 706 (FIG. 7) of the stripes approaches a wave length of light, it won't matter. Because the non primary holodots will be at such a great angle that none of the viewers will see it.

Referring to FIG. 7, Item 702 is a top view of the panel 701 showing a cylindrical curvature in front of each liquid crystal phase shifting stripe. This is needed for non wave length 706 spacings to create the light spread 703 necessary for a useful angle of view.

Improvement

Referring to FIG. 4 of a typical pixel of the spacial light modulator, A smooth transition between a typical pixel 402 and its neighbor will result in a better picture quality than the abrupt ones shown here.

Figure 9:
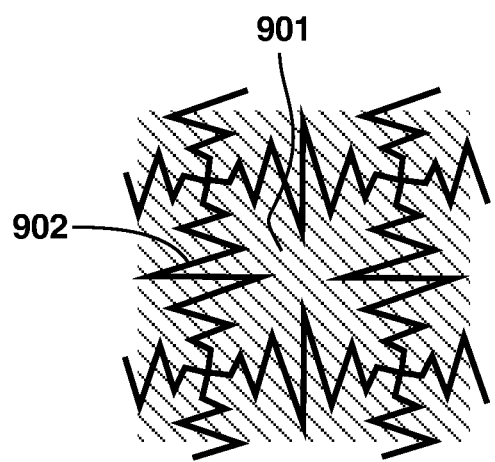
FIG. 9 is a front view of a single modulating cell, with serrated edges, of the 2 dimensional spatial light modulator.

FIG. 9 shows a method for obtaining a smooth transition between pixels. Here the straight line borders 401 typical of FIG. 4 are replaced by the serrated borders 902 typical. The scattered light caused by the abrupt borders of the serrations will fall outside the viewers pupil. The viewer will only see a smooth transition of the mixing of the pixels in the overlap region.

As with the pixel of FIG. 4. This serrated border pixel can be built using beam expander techniques.

The Flat Beam Expander

Figure 1:
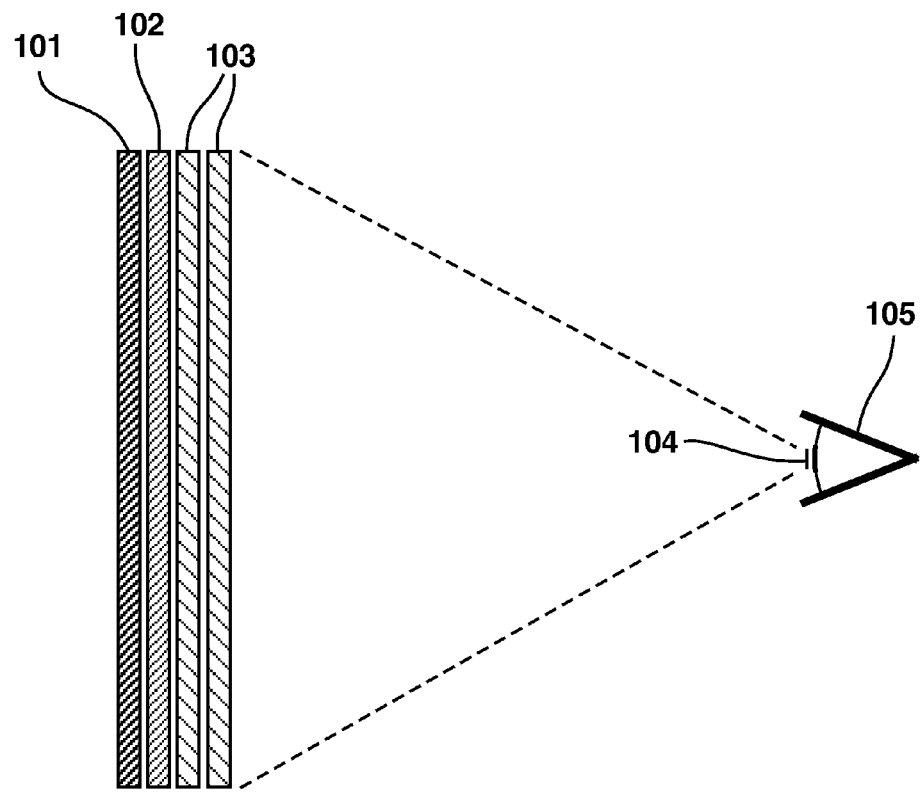
FIG. 1 is a side view of an apparatus capable of generating a holodot according to a preferred embodiment. It also contains the holodot and an observer's eye.

Referring to FIG. 1, as all ready mentioned, the flat beam expander 101 provides the same function as a laser/telescope beam expander combination except in a flat package.

It can be made using the same techniques used in beam splitters. This is because we are using coherent laser light and all the phase and amplitude imbalances can be corrected for in the spacial light modulator 102.

Calibration

There are two types of calibrations that will be mentioned here. The first is for component manufacturing error and age, temperature, and any other factor drift error.

Each of these display system has a powerful processor, two cameras, and just about every thing can be independently adjusted by the processor. All the necessary hardware is already there for component calibration. It's just a matter of software.

The second is for the viewer's eye balls. As mentions earlier, the measured distance between the viewer's pupils can be used to determine the distance form the viewer of the object which he focused on. This, however, can only be done if one knows both the diameter viewer's eye balls and the distance between the axis's of rotation of the eye balls.

To get this information one can take advantage of the fact that the director of a movie determines what a viewer will be concentrating on or looking at. This information can be transferred to the display system through the basic camera information stored with each frame. This would include lens separation, angle of inward pointing of the lenses, total angular field of view, and focus ring setting.

Initially the display would use this information to set distance of focused image plane (FIP). The display would then log several distances of the FIP verses pupil separations. Once the display has enough of this information to accurately calculate both the diameter viewer's eye balls and the distance between the axis's of rotation of the eye balls, it will do so, and then change over to using pupil distance to set the distance of the FIP.

The display can also use facial recognition to identify a repeat viewer so that, it can skip this calibration mode.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. An apparatus responsive to coherent laser light and operative to generate at least one holodot at an observer's pupil, comprising:
    (a) a first spatial light modulator panel;
    (b) a second spatial light modulator panel comprising the modulating cells elongated in the same direction with the ratio of the elongated dimension to the non elongated dimension greater than 10;
    (c) a third spatial light modulator panel comprising the modulating cells elongated in the same direction with the ratio of the elongated dimension to the non elongated dimension greater than 10; and
    (d) the direction of the modulating cell's elongation of the second spatial light modulator panel is different form the direction of the modulating cell's elongation of the third spatial light modulator panel.

2. An apparatus responsive to coherent laser light and operative to generate at least one holodot, comprising:
    (a) a first spatial light modulator panel;
    (b) a second spatial light modulator panel comprising the modulating cells elongated in the same direction with the ratio of the elongated dimension to the non elongated dimension greater than 10;
    (c) a third spatial light modulator panel comprising the modulating cells elongated in the same direction with the ratio of the elongated dimension to the non elongated dimension greater than 10; and
    (d) the direction of the modulating cell's elongation of the second spatial light modulator panel is different form the direction of the modulating cell's elongation of the third spatial light modulator panel.

3. An apparatus responsive to coherent laser light and operative to generate at least one holodot at an observer's pupil, comprising:
    (a) a first spatial light modulator panel;
    (b) a second spatial light modulator panel comprising the modulating cells elongated in the vertical direction with elongation extending from the top of the panel to the bottom of the panel; and
    (c) a third spatial light modulator panel comprising the modulating cells elongated in the horizontal direction with elongation extending from one side of the panel to the other side of the panel.

4. An apparatus responsive to coherent laser light and operative to generate at least one holodot at an observer's pupil, comprising:
    (a) a first spatial light modulator panel;
    (b) a second spatial light modulator panel comprising liquid crystal phase only modulating cells elongated in the vertical direction with elongation extending from the top of the panel to the bottom of the panel; and
    (c) a third spatial light modulator panel comprising liquid crystal phase only modulating cells elongated in the horizontal direction with elongation extending from one side of the panel to the other side of the panel.

5. A method for generate at least one holodot at an observer's pupil using an apparatus responsive to coherent laser light, said method comprising:
    (a) spatially modulating light with a first spatial light modulator panel;
    (b) spatially modulating light with a second spatial light modulator panel comprising the modulating cells elongated in the same direction with the ratio of the elongated dimension to the non elongated dimension greater than 10;
    (c) spatially modulating light with a third spatial light modulator panel comprising the modulating cells elongated in the same direction with the ratio of the elongated dimension to the non elongated dimension greater than 10; and
    (d) the direction of the modulating cell's elongation of the second spatial light modulator panel is different form the direction of the modulating cell's elongation of the third spatial light modulator panel.

6. A method for generate at least one holodot using an apparatus responsive to coherent laser light, said method comprising:
    (a) spatially modulating light with a first spatial light modulator panel;
    (b) spatially modulating light with a second spatial light modulator panel comprising the modulating cells elongated in the same direction with the ratio of the elongated dimension to the non elongated dimension greater than 10;
    (c) spatially modulating light with a third spatial light modulator panel comprising the modulating cells elongated in the same direction with the ratio of the elongated dimension to the non elongated dimension greater than 10; and
    (d) the direction of the modulating cell's elongation of the second spatial light modulator panel is different form the direction of the modulating cell's elongation of the third spatial light modulator panel.

\* \* \* \* \*